US012215839B1

(12) United States Patent
She

(10) Patent No.: US 12,215,839 B1
(45) Date of Patent: Feb. 4, 2025

(54) FLAME APPARATUS OF ELECTRIC CANDLE

(71) Applicant: Dongguan Shuiquanzi Industrial Co., Ltd., Guangdong (CN)

(72) Inventor: Huilin She, Guangdong (CN)

(73) Assignee: Dongguan Shuiquanzi Industrial Co., Ltd., Dongguan (CN)

( * ) Notice: Subject to any disclaimer, the term of this patent is extended or adjusted under 35 U.S.C. 154(b) by 0 days.

(21) Appl. No.: 18/815,657

(22) Filed: Aug. 26, 2024

(30) Foreign Application Priority Data

Jul. 25, 2024 (CN) ......................... 202411008505.2

(51) Int. Cl.

| | |
|---|---|
| ***F21S 6/00*** | (2006.01) |
| ***F21S 10/04*** | (2006.01) |
| ***F21V 3/02*** | (2006.01) |
| ***F21V 3/06*** | (2018.01) |
| ***F21V 9/08*** | (2018.01) |
| ***F21V 23/00*** | (2015.01) |
| ***F21Y 105/12*** | (2016.01) |
| ***F21Y 115/10*** | (2016.01) |

(52) U.S. Cl.

CPC ............. *F21S 6/001* (2013.01); *F21S 10/043* (2013.01); *F21V 3/02* (2013.01); *F21V 3/06* (2018.02); *F21V 9/08* (2013.01); *F21V 23/005* (2013.01); *F21Y 2105/12* (2016.08); *F21Y 2115/10* (2016.08)

(58) Field of Classification Search

None

See application file for complete search history.

(56) References Cited

U.S. PATENT DOCUMENTS

| | | | | |
|---|---|---|---|---|
| 9,689,544 | B2 * | 6/2017 | Green, Jr. .......... | H05B 47/1985 |
| 11,466,830 | B1 * | 10/2022 | Zheng ...................... | F21S 6/001 |
| 12,078,303 | B1 * | 9/2024 | Huang .................... | F21S 6/001 |
| 2017/0191632 | A1 * | 7/2017 | Li ............................. | F21V 3/00 |

* cited by examiner

*Primary Examiner* — Alan B Cariaso

(57) ABSTRACT

A flame apparatus of an electric candle includes: a PCBA board, including a flame portion having a first side face and a second side face disposed opposite to each other; a plurality of lamp beads, arranged on the first side face; a first color-toning layer, disposed on the first side face and configured to encapsulate the plurality of lamp beads; a second color-toning layer, having a substantially same color as the first color-toning layer and disposed on the second side face; and a lamp head cover, arranged around a periphery of the first color-toning layer and the second color-toning layer and including a first side wall and a second side wall, wherein the first color-toning layer is covered by the first side wall, the second color-toning layer is covered by the second side wall, and the first side wall has a thickness greater than the second side wall.

20 Claims, 5 Drawing Sheets

FLAME APPARATUS OF ELECTRIC CANDLE

CROSS-REFERENCE TO RELATED APPLICATIONS

This application claims the priority of Chinese Patent Application No. 202411008505.2, filed on Jul. 25, 2024, the disclosure of which is hereby incorporated by reference in their entireties.

FIELD

The present disclosure relates to the field of electric candles, and in particular to a flame apparatus of an electric candle.

BACKGROUND

Electric candles have the characteristics of smokeless, strong safety, long service life, etc., and have been used to replace traditional candles in many occasions. For the flame apparatus of an electric candle in the related art, in order to achieve a same color and brightness of the light from both sides and better simulation effect, lamp beads are generally provided on both front and back sides of a PCBA board. In this way, the number of lamp beads required increases exponentially, thereby increasing cost and energy consumption.

SUMMARY

The present disclosure provides a flame apparatus of an electric candle, including: a PCBA board, a plurality of lamp beads, a first color-toning layer, a second color-toning layer, and a lamp head cover. The PCBA board includes a flame portion that allows light to pass through and has a first side face and a second side face disposed opposite to first side face. The plurality of lamp beads are arranged on the first side face. The first color-toning layer is colored and allowing light to pass through. The first color-toning layer is disposed on the first side face and encapsulates the plurality of lamp beads. The second color-toning layer, allowing light to pass through and having a substantially same color as the first color-toning layer. The second color-toning layer is disposed on the second side face. The lamp head cover is semi-transparent and sleeves the first color-toning layer and the second color-toning layer. The lamp head cover comprises a first side wall and a second side wall, the first side wall covers the first color-toning layer, the second side wall covers the second color-toning layer, and a thickness of the first side wall is greater than a thickness of the second side wall.

DETAILED DESCRIPTION

In order to make the objects, features and advantages of the present disclosure more apparent and understandable, the following specific embodiments of the present disclosure are described in detail in conjunction with the accompanying drawings.

It is to be noted that the terms "first", "second" and the like in the specification and claims of the present disclosure and the above-described accompanying drawings are used to distinguish between similar objects and need not be used to describe a particular order or sequence. It should be understood that these serial numbers may be interchanged where appropriate so that the embodiments of the present disclosure described herein can be implemented in an order other than those illustrated or described herein.

In the description of the present disclosure, it should be noted that, unless otherwise expressly provided and qualified, the terms "configured", "assembly", "communicated", and "connected" are to be understood in a broad sense. For example, the connection may be a fixed connection, a removable connection, or a one-piece connection; it may be a mechanical connection; it may be a direct connection, an indirect connection through an intermediate medium, or a communication within two elements. For those of ordinary skill in the art, the specific meanings of the above terms in this disclosure may be understood on a case-by-case basis.

In the description of the present specification, the description of "embodiment", "an embodiment" and "an implementation" means that the specific features, structures, materials or characteristics described in conjunction with the embodiment or implementation are included in at least one embodiment or implementation of the present disclosure. In this specification, schematic expressions of the above terms do not necessarily refer to a same embodiment or implementation. Moreover, the specific features, structures, materials, or characteristics described may be combined in any one or more embodiments or implementations in an appropriate manner.

The present disclosure is described in detail below in conjunction with the accompanying drawings.

Figure 1:
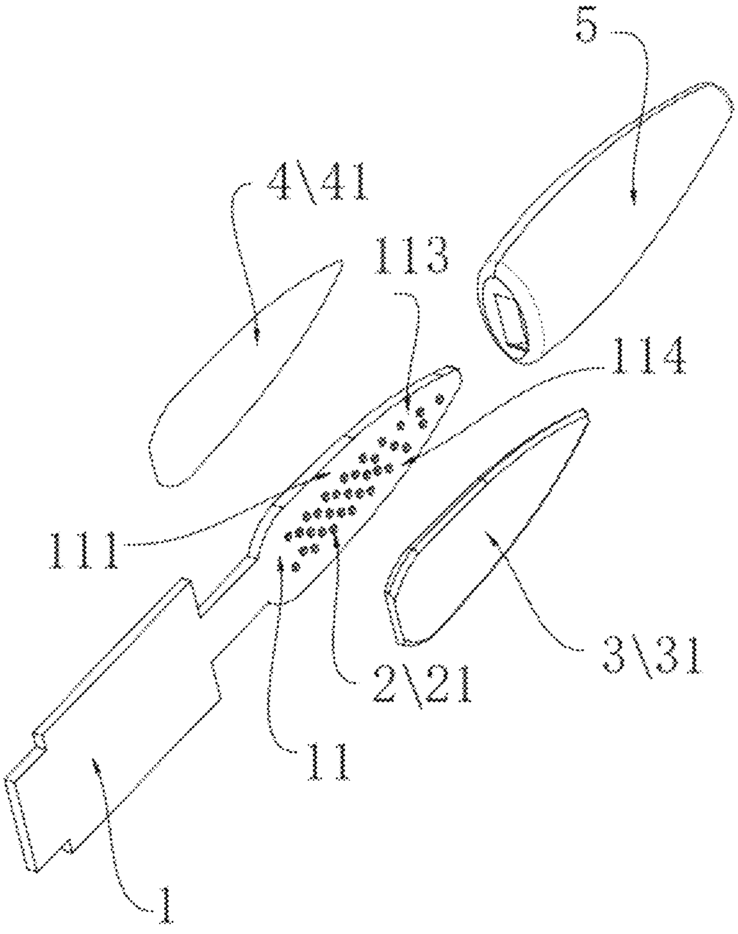
FIG. 1 is an exploded structural view of a flame apparatus of an electric candle according to an embodiment of the present disclosure.
Figure 2:
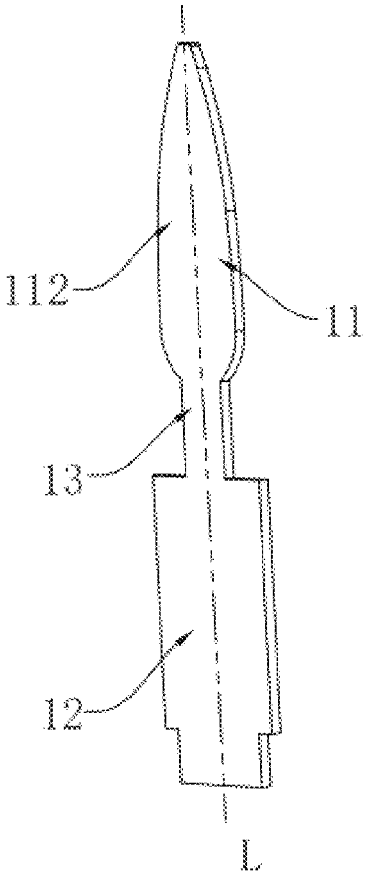
FIG. 2 is a structure structural view of a PCBA board according to an embodiment of the present disclosure.
Figure 3:
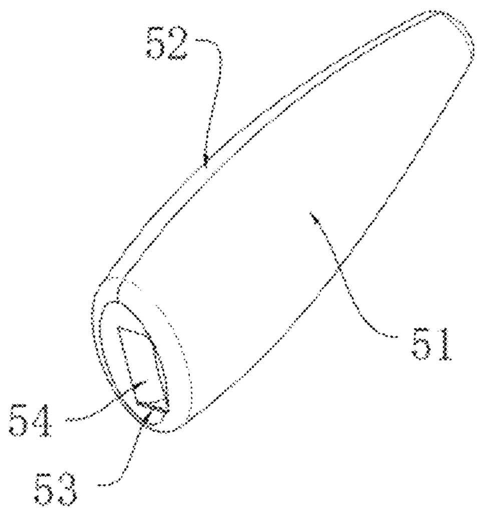
FIG. 3 is a structure structural view of a lamp head cover according to an embodiment of the present disclosure.

In order to solve the above technical problems, as shown in FIGS. 1, 2, and 3, a flame apparatus of an electric candle is provided in embodiments of the present disclosure.

The flame apparatus includes a PCBA board 1, a plurality of lamp beads 2, a first color-toning layer 3, a second color-toning layer 4, and a lamp head cover 5. The PCBA board 1 includes a flame portion 11 that allows light to pass through and has a first side face 111 and a second side face 112 disposed opposite to the first side face 111. The plurality of lamp beads 2 are arranged on the first side face 111. The first color-toning layer 3 is colored and allows light to pass through. The first color-toning layer 3 is disposed on the first side face 111 and encapsulates the plurality of lamp beads 2. The second color-toning layer 4 allows light to pass through and has a substantially same color as the first color-toning layer 3. The second color-toning layer 4 is disposed on the second side face 112. The lamp head cover 5 is semi-transparent and sleeves the first color-toning layer 3 and the second color-toning layer 4. The lamp head cover 5 includes a first side wall 51 and a second side wall 52. The first side wall 51 covers the first color-toning layer 3, the second side wall 52 covers the second color-toning layer 4, and the first side wall 51 has a thickness greater than the second side wall 52.

It should be noted that since the flame portion 11 allows light to pass through, light emitted by the plurality of lamp beads 2 can pass through the flame portion 11 and can be emitted from the second side face 112. However, a color and brightness of the light may change after passing through the flame portion 11. In this embodiment, the first color-toning layer 3 and the second color-toning layer 4 both allow light to pass through and have a substantially same color. In addition, the first color-toning layer 3 is disposed on the first side face 111, and the second color-toning layer 4 is disposed on the second side face 112. In this way, that the light after passing through the flame portion 11 may have a uniform color. Moreover, as the brightness of the light passing through the flame portion 11 to reach the second side face 112 may be reduced, the lamp head cover 5 having various wall thicknesses is arranged to sleeve the flame portion 11. In this way, the brightness of the light output from the first side face is substantially the same as the brightness of the light output from the second side face. Moreover, the lamp head cover 5 scatters the light of the plurality of lamp beads 2, preventing the light from exhibiting obvious granularity, and improving simulation of the flame apparatus. In summary, the flame apparatus of the present embodiment has a consistent color and consistent brightness of light on both side faces by arranging the plurality of lamp beads 2 on only one side face of the PCBA board 1, greatly reducing product costs and energy consumption of the flame apparatus of the present disclosure compared to the product in the art.

In an embodiment of the present disclosure, as shown in FIG. 1, the first color-toning layer 3 is an encapsulating layer 31. The second color-toning layer 4 is a UV oil layer 41.

It should be noted that the encapsulating layer 31 is an adhesive layer formed by using encapsulation adhesive to encapsulate the plurality of lamp beads 2. In this way, waterproof, moisture-proof, anti-vibration, dust-proof, and heat dissipation of the plurality of lamp beads 2 are achieved. By configuring the first color-toning layer 3 as the colored and light-transmittable encapsulating layer 31, the color of the light transmitted through the encapsulating layer 31 can be changed, and the plurality of lamp beads 2 are protected. The UV oil substantially includes UV ink, UV varnish, UV polish, and so on. These UV oils can be cured by being exposed to a UV light. A UV oil, which has the substantially same color as the encapsulating layer 31 and is transparent, may be used to coat on the second side face 112 and is cured by UV irradiation, such that the UV oil layer 41 is formed. The UV oil layer 41 can also change the color of the light passing through the UV oil layer 41. In this way, the light emitted from the two side faces are in substantially the same color.

In an embodiment of the present disclosure, as illustrated in FIG. 1, both the first color-toning layer 3 and the second color-toning layer 4 are in a color of yellow or orange, which is similar to a color of a candle flame.

It should be noted that the first color-toning layer 3 and the second color-toning layer 4 are in the color of yellow or orange. Therefore, in addition to enabling the light output from the two side faces to have substantially the same color, the color of the light is closer to a color of a real candle flame. Moreover, when the first color-toning layer 3 and the second color-toning layer 4 are yellow or orange, lamp beads 2 that emit blue light or light in other colors may be applicable. After being toned by the first color-toning layer 3 and the second color-toning layer 4, and the color output from the lamp beads 2 can be ultimately shown as being similar to the color of the candle flame, such that a larger number of lamp beads 2 may be selected.

In an embodiment of the present disclosure, as illustrated in FIGS. 1 and 3, the flame portion 11 is substantially elliptical shape having a tip end, so as to simulate a shape of the candle flame.

It should be noted that the flame portion 11 is in the substantially elliptical shape having the tip end, i.e., similar to a shape of an orthographic projection of a common candle flame. Further, the lamp head cover 5 is arranged to sleeve the flame portion 11 to form a three-dimensional configuration, such that the flame apparatus can simulate the shape of the candle flame of the real candle more realistically.

In an embodiment of the present disclosure, as illustrated in FIGS. 1 and 3, the lamp head cover 5 is made of soft silicone and defines an accommodating cavity therein. An opening 53 is defined in a bottom of the lamp head cover 5. The opening 53 is communicated to the accommodating cavity 54. The first color-toning layer 3, the flame portion 11, and the second color-toning layer 4 can be inserted to an interior of the lamp head cover 5 from the opening 53.

It is to be noted that the lamp head cover 5 may be made of white light-transmitting soft silicone, and therefore, the lamp head cover 5 can be elastically deformed to some extent. The first color-toning layer 3, the flame portion 11, and the second color-toning layer 4 are able to expand the opening 53 to enter the accommodating cavity 54. Therefore, the opening 53 may be small in size, such that the opening may be invisible after assembling. Moreover, due to the elastic deformation of the lamp head cover 5, attachment of the wall of the accommodation cavity 54 with the first color-toning layer 3 and the second color-toning layer 4 can be ensured, preventing a large gap, which may affect the light transmission.

Referring to FIGS. 1 and 3, in an embodiment of the present disclosure, the lamp head cover 5 may be in a shape of a flat cone similar to a shape of a candle flame.

It is to be noted that the lamp head cover 5 is substantially flat and has a contour similar to the shape of the candle flame. That is, the lamp head cover 5 is in a flat conical shape. Understandably, the accommodation cavity 54 is also in a flat conical shape to accommodate the first color-toning layer 3, the flame portion 11, and the second color-toning layer 4. A width direction of the accommodation cavity 54 is substantially the same as a width direction of the lamp head cover 5. The first side wall 51 of the lamp head cover 5 is arranged facing towards the first color-toning layer 3, and the second side wall 52 of the lamp head cover 5 is arranged facing towards the second color-toning layer 4. Both the first side wall 51 and the second side wall 52 are flat. A thickness of the first side wall 51 is greater than a thickness of the second side wall 52, so that the brightness of the light transmitted from both sides of the lamp head cover 5 are substantially the same to each other. It is to be understood that the thickness may also be adjusted according to the brightness demands of the light emitted from the two sides.

In an embodiment of the present disclosure, as shown in FIGS. 1 and 3, the thickness of the first side wall 51 is twice of the thickness of the second side wall 52.

It is to be noted that in the present disclosure, the brightness of the light after passing through the first color-toning layer 3 is compared to the brightness of the light after sequentially passing through the PCBA board 1 and the second color-toning layer 4, and the thicknesses of the first side wall 51 and the second side wall 52 are adjusted based on a result of the comparison. When the thickness of the first side wall 51 is twice of the thickness of the second side wall 52, the brightness of the light emitted from the two sides are consistent to each other. It is to be understood that the thicknesses can be determined according to the brightness demands of the light emitted from the two sides.

In an embodiment of the present disclosure, referring to FIG. 1, the encapsulating layer 31 covers the first side face 111 of the flame portion 11. An adhesive layer protruding from the first side face 111 is formed after the encapsulating layer 31 encapsulating the plurality of lamp beads 2. The UV oil layer 41 is thinly coated on the second side face 112 of the flame portion 11 and spread over the entire second side face 112.

It should be noted that encapsulation adhesive may include 47% epoxy resin, 35% silicone, 3% color powder, 5% phosphor powder, and 10% diffusion powder, in mass fractions. The color of the encapsulation adhesive is substantially determined by the color of the color powder. By mixing the color powder, a color mimicking the candle flame can be obtained. The encapsulating layer 31 can be formed by coating the encapsulation adhesive on the first side face 111. The encapsulating layer 31 has a relatively large thickness and is disposed protruding from the first side face 111 to encapsulate the plurality of lamp beads 2. If the encapsulating layer 31 is further used on the second side face 112, production costs may be increased. Therefore, a thin UV oil layer may be coated on the second side face 112 and cured by UV irradiation to form the UV oil layer 41. As the UV oil may be in various colors, the UV oil having a color that is consistent with the encapsulating layer 31 may be used, such that the color of the light can be changed, and the production costs can be reduced.

In an embodiment of the present disclosure, shown in conjunction with FIG. 1, the flame portion 11 is a fully transparent fiberglass board or a semi-transparent fiberglass board.

It is to be noted that the flame portion 11 is configured as a transparent or semi-transparent fiberglass board, so as to enable the light emitted by the plurality of lamp beads 2 to pass through the flame portion 11 and to be output from the second side face 112. In addition, the fiberglass board has a certain support strength, which fixedly support the lamp head cover 5 to prevent the flame apparatus from bending or being deformed to affect the simulation effect. In other embodiments, the flame portion 11 may be made of other light-transmittable materials, such as a glass-based PCB board, a PET (polyester)-based PCB board, a PC (polycarbonate)-based PCB board, an MMA (methyl methacrylate)-based PCB board, and the like. It is to be understood that the PCBA board 1 may be configured as a one-piece structure, so that the PCBA board 1 may entirely be made of the fiberglass board, further reducing processing difficulty.

In an embodiment of the present disclosure, illustrated in conjunction with FIG. 1, each of the plurality lamp beads 2 is an inverted micro light-emitting diode 21, and the inverted micro light-emitting diode 21 is attached to the flame portion 11.

It should be noted that, since each of the plurality of lamp beads 2 is a micro light-emitting diode 21, the plurality of lamp beads 2 can be attached to the flame portion 11. In this way, the brightness of the light is maintained even after the light passes through the flame portion 11, and encapsulation by the encapsulating layer 31 can be performed easily. In addition, the inverted configuration of the light-emitting diode 21 achieves a higher light-emitting efficiency, and light transmission and a light-emitting angle can be controlled more efficiently, a loss in the light is reduced, and the encapsulation has a relatively simple structure, further reducing the production costs.

Figure 5:
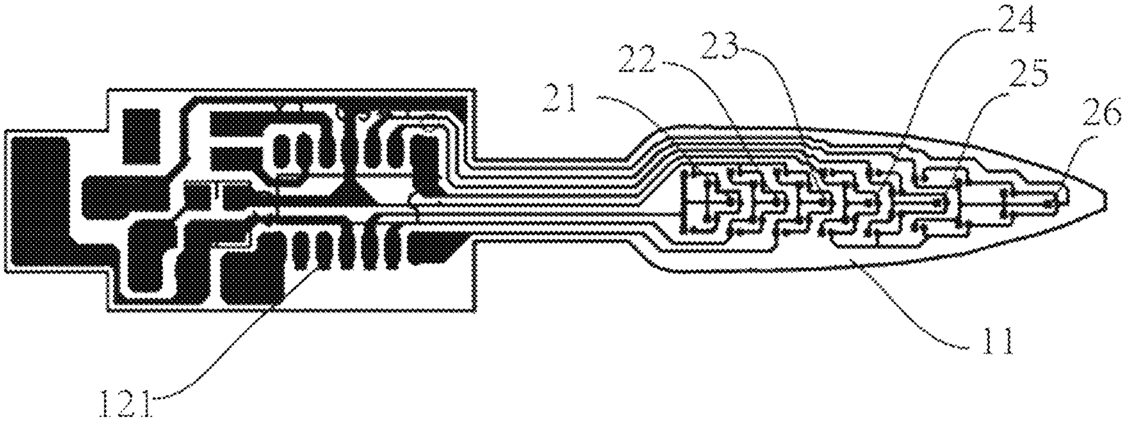
FIG. 5 is a distribution structural view of lamp beads according to an embodiment of the present disclosure.

Referring to FIGS. 1, 2 and 5, in another embodiment of the present disclosure, the PCBA board 1 further includes a base portion 12 and a wick portion 13. The base portion 12, wick portion 13, and flame portion 11 are sequentially connected to each other. The base portion 12 is arranged with a control module 121. The control module 121 is electrically connected to each of the plurality of lamp beads 2 to control the plurality of the lamp beads 2 to illuminate or control the plurality of lamp beads 2 to be switched off, according to a set time sequence.

It is noted that the electric candle generally includes a candle tube 6. The base portion 12 is disposed inside the candle tube 6, and the wick portion 13 passes through a center of a top surface 61 of the candle tube 6 to be connected with the flame portion 11. The base portion 12 is arranged with a control module 121. The control module 121 is a control chip having a plurality of pins. The PCBA board 1 is further arranged with a conductive line. Each of the plurality of pins of the control chip is electrically connected to a corresponding lamp bead 2 through the conductive line to control each of the plurality of lamp beads 2 to illuminate or to be switched off according to the set time sequence, such that jumping and swaying of the flame of a real candle is simulated realistically.

Figure 4:
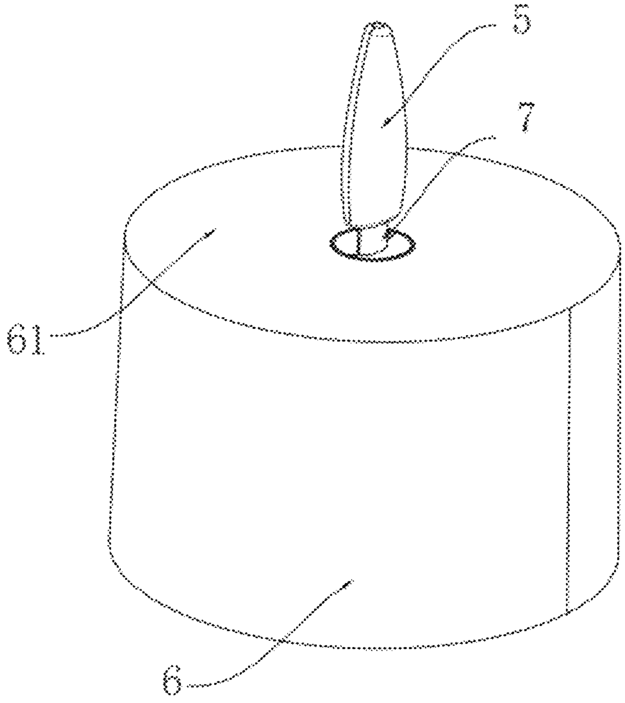
FIG. 4 is a structure structural view of an electric candle according to an embodiment of the present disclosure.

Referring to FIG. 4, in an embodiment of the present disclosure, the wick portion 13 is in a shape of an elongated strip. The wick portion 13 is black in color, or a black housing 7 is arranged around a periphery of the wick portion 13 to simulate a color of a burning wick.

It is to be noted that the wick portion 13 is arranged in the form of the elongated strip, and the wick portion 13 is coated with black paint, or the wick portion 13 is peripherally surrounded by the black housing 7. In this way, the wick portion 13 can simulate a shape and a color of a real wick of a real burning candle, the electric candle in overall simulates the real candle more realistically.

In an embodiment of the present disclosure, illustrated in conjunction with FIGS. 1 and 5, the plurality of lamp beads 2 are sequentially distributed along an axial direction of the flame portion 11 and arranged into a plurality of groups. At least one group of the lamp beads 2 located at a top 113 of the flame portion 11 are distributed to form a shape of a conical tip having a width that is gradually decreased towards the top of the conical tip.

It is to be noted that the plurality of lamp beads 2 are distributed on the first side face 111 of the flame portion 11 in a shape that mimics the candle flame of the real candle. Specifically, the plurality of lamp beads 2 are sequentially disposed along the axial direction of the flame portion 11 and are arranged into the plurality of groups. As the top of the candle flame of the real candle is tip-shaped, at least one group of lamp beads 2 located at the top 113 of the flame portion 11 are distributed to form the conical tip having the width that is gradually decreased towards the tip end to simulate a tip end of the candle flame of the real candle. Compared to the related art in which a plurality of lamp beads 2 are distributed to form a matrix, in the present disclosure, the number of lamp beads 2 is reduced, while the simulation effect is ensured, further reducing the product costs.

Referring to FIGS. 1 and 5, in an embodiment of the present disclosure, each group of lamp beads 2 are distributed symmetrically, taking a center axis L of the flame portion 11 as a symmetrical axis.

It should be noted that each group of lamp beads 2 are distributed symmetrically, taking a center axis L of the flame portion 11 as a symmetrical axis, and each group of lamp beads 2 are arranged to have the conical tip extending upwardly. In an embodiment in the present disclosure, the plurality of lamp beads 2 are located into six groups. Specifically, each of five groups disposed at a lower part includes five lamp beads 2. The five lamp beads 2 are distributed in a left-right symmetrical manner and are distributed into three rows. A sixth group of lamp beads 2 located at the top 113 includes seven lamp beads 2. The seven lamp beads 2 are distributed in a left-right symmetrical manner and are distributed into four rows. Lamp beads of two adjacent groups are partially interlaced with each other in the direction along the center axis L of the flame portion 11, such that the lamp beads in the plurality of groups are arranged more closely to each other. When each group of lamp beads 2 illuminate, light that covers a relatively large-sized triangular region is emitted. When the interlaced plurality of groups of light beads are switched off and illuminate according to a set time sequence, a layering effect of the light is weakened. In this way, a dynamic change of the real candle flame is simulated more realistically.

In an embodiment of the present disclosure, as shown in FIGS. 1 and 5, in a direction extending upwardly towards the tip end of the flame, a spacing between lamp beads 2 arranged on an upper half 114 of the flame portion 11 is gradually increased.

It is to be noted that in the present embodiment, in the direction extending upwardly towards the tip end of the flame, the spacing between lamp beads 2 arranged on the upper half 114 of the flame portion 11 is gradually increased, that is, as the lamp beads 2 are located closer to the top 113 of the conical tip, the spacing between adjacent rows of lamp beads 2 is larger. In this way, the dynamic change of the top 113 is more obvious, and the top end of the real candle flame being fluttered by the wind can be imitated, further improving the simulation effect.

Referring to FIGS. 1 and 5, in another embodiment of the present disclosure, the plurality of groups of lamp beads 2 include three functional areas distributed along the axial direction of the flame portion 11 from a bottom to the top. The three functional areas include a breathing functional area, a breathing jumping functional area, and a wind-induced flame functional area in sequence.

It should be noted that, in order to mimic the jumping and swaying of a real burning candle flame, the lamp beads 2 needs to illuminate or be switched off according to a set time sequence. The plurality of lamp beads 2 are arranged into three functional areas, distributed from the bottom to the top according to the states in which the lamp beads 2 illuminate or are switched off. Specifically, the lamp beads in the breathing functional area can mimic a flickering state of the bottom of the real candle flame when the real candle flame is jumping and swaying. The lamp beads in the breathing jumping functional area can mimic the flickering and floating state of a middle of the real candle flame when the real candle flame is jumping and swaying. The lamp beads in the wind-induced flame functional area can mimic the state of leaping upwards even with sparks floating up of the top of a real candle flame when the real candle flame is blown. In this way, a more realistic simulation effect is achieved.

Referring to FIGS. 1 and 5, in an embodiment of the present disclosure, the breathing functional area includes at least a first group of lamp beads 21 and a second group of lamp beads 22 sequentially arranged from the bottom to the top. The first group of lamp beads 21 and the second group of lamp beads 22 are configured to exhibit a breathing variation according to a set time sequence. The second group of lamp beads 22 has a breathing variation frequency greater than the first group of lamp beads 21

It is to be noted that the breathing variation refers to a cyclic change of each lamp bead 2 from dark to bright and from bright to dark. The breathing variation of the first group of lamp beads 21 and the second group of lamp beads 22 can produce a flickering effect, thereby imitating the state of the bottom of a real burning candle flame. Furthermore, as the breathing variation frequency of the second group of lamp beads 22 is greater than that of the first group of lamp beads 21, the produced flickering and swaying effect can be more obvious.

In another embodiment of the present disclosure, as illustrated in FIGS. 1 and 5, the breathing jumping functional area includes at least a third group of lamp beads 23 and a fourth group of lamp beads 24 sequentially arranged from bottom to top. The third group of lamp beads 23 and the fourth group of lamp beads 24 are configured to be cyclically illuminate in sequence from the bottom to the top and from the top to the bottom, and simultaneously, the third group of lamp beads 23 and the fourth group of lamp beads 24 exhibit the breathing variation according to a set time sequence. The fourth group of lamp beads 24 has a cyclic lighting frequency greater than the third group of lamp beads 23, and the fourth group of lamp beads 24 has a breathing variation frequency lower than the third group of lamp beads 23.

It should be noted that the third group of lamp beads 23 and the fourth group of lamp beads 24 are configured to cyclically illuminate in sequence from the bottom to the top and from the top to the bottom to imitate the floating and swaying state of the real candle flame. In the process of lighting, the lamp beads 2 gradually illuminate from dark to bright, and in the process of extinguishing, the lamp beads 2 are gradually switched off from bright to dark. In this way, the breathing effect can be further superimposed on the floating effect to mimic the flickering state of a real candle flame when it is swaying and floating. The fourth group of lamp beads 24 has a cyclic lighting frequency greater than the third group of lamp beads 23. Correspondingly, when the candle flame is floating, for the upper part of the candle flame, the floating amplitude is larger and the floating speed is faster, so that the floating effect is more obvious. The fourth group of lamp beads 24 has a breathing variation frequency lower than the third group of lamp beads 23. Correspondingly, the flickering effect of the lower part is more pronounced when the candle flame is floating.

Referring to FIGS. 1 and 5, in an embodiment of the present disclosure, the wind-induced flame functional area includes at least a fifth group of lamp beads 25 and a sixth group of lamp beads 26 sequentially arranged from the bottom to the top. The fifth group of lamp beads 25 and the sixth group of lamp beads 26 are configured to cyclically illuminate in sequence from the bottom to the top according to a set time sequence. The sixth group of lamp beads 26 has a cyclic illuminating frequency greater than the fifth group of lamp beads 25.

It should be noted that the fifth group of lamp beads 25 and the sixth set of lamp beads 26 illuminate sequentially from the bottom to the top, thereby imitating the effect of leaping upwards of the real candle flame while being blown. The sixth group of lamp beads 26 has a cyclic illuminating frequency greater than the fifth group of lamp beads 25, thus the effect of leaping upwards of the top of the candle flame can be more obvious, and the leaping speed can be faster. In summary, the light on and off variation of the six groups of lamp beads 2 can make the light effect of the flame apparatus more realistic.

It should be noted that the various embodiments not listed above formed by the combination of the aforesaid technical features with each other are considered to be within the scope recorded in the specification of the present application. Moreover, to a person of ordinary skill in the art, improvements or transformations may be made in accordance with the above description, and all such improvements and transformations shall fall within the scope of protection of the appended claims of the present application.

What is claimed is:

1. A flame apparatus of an electric candle, comprising:

a PCBA board, comprising a flame portion that allows light to pass through and has a first side face and a second side face disposed opposite to first side face;

a plurality of lamp beads, arranged on the first side face;

a first color-toning layer, being colored and allowing light to pass through, wherein the first color-toning layer is disposed on the first side face and encapsulates the plurality of lamp beads;

a second color-toning layer, allowing light to pass through and having a substantially same color as the first color-toning layer, wherein, the second color-toning layer is disposed on the second side face; and a lamp head cover, being semi-transparent and sleeves the first color-toning layer and the second color-toning layer, wherein, the lamp head cover comprises a first side wall and a second side wall, the first side wall covers the first color-toning layer, the second side wall covers the second color-toning layer, and a thickness of the first side wall is greater than a thickness of the second side wall.

2. The flame apparatus of the electric candle according to claim 1, wherein the first color-toning layer is an encapsulating layer, and the second color-toning layer is a UV oil layer.

3. The flame apparatus of the electric candle according to claim 1, wherein each of the first color-toning layer and the second color-toning layer is in a color of yellow or orange, being similar to a color of a candle flame.

4. The flame apparatus of the electric candle according to claim 1, wherein the flame portion is in a substantially elliptical shape having a tip end to simulate a shape of a candle flame.

5. The flame apparatus of the electric candle according to claim 1, wherein the lamp head cover is made of soft silicone and defines an accommodating cavity, an opening is defined in a bottom of the lamp head cover and is communicated to the accommodating cavity; and the first color-toning layer, the flame portion, and the second color-toning layer are inserted into an interior of the lamp head cover from the opening.

6. The flame apparatus of the electric candle according to claim 1, wherein the lamp head cover is in a shape of a flat cone to simulate a shape of a candle flame.

7. The flame apparatus of an electric candle according to claim 1, wherein a thickness of the first side wall is twice of a thickness of the second side wall.

8. The flame apparatus of the electric candle according to claim 2, wherein the encapsulating layer covers the first side face of the flame portion, an adhesive layer protruding from the first side face is formed by taking the encapsulating layer to encapsulate the plurality of lamp beads, and the UV oil layer is thinly coated on the second side face of the flame portion and spreads to cover an entirety of the second side face.

9. The flame apparatus of the electric candle according to claim 1, wherein the flame portion is a fully transparent or semi-transparent fiberglass board.

10. The flame apparatus of the electric candle e according to claim 1, wherein each of the plurality lamp beads is an inverted micro light-emitting diode, and the inverted micro light-emitting diode is attached to the flame portion.

11. The flame apparatus of the electric candle according to claim 1, wherein the PCBA board further comprises a base portion and a wick portion; the base portion, the wick portion, and the flame portion are sequentially connected to each other; the base portion is arranged with a control module that is electrically connected to each of the plurality of lamp beads to control the plurality of the lamp beads to illuminate or to switch off the plurality of the lamp beads according to a set time sequence.

12. The flame apparatus of the electric candle according to claim 11, wherein the wick portion is in a shape of an elongated strip, the wick portion is black in color, or a black housing is arranged to surround a periphery of the wick portion to simulate a color of a burning wick.

13. The flame apparatus of an electric candle according to claim 1, wherein the plurality of lamp beads are sequentially distributed along an axial direction of the flame portion and are arranged in a plurality of groups, and at least one group of the plurality of groups of the lamp beads located at a top of the flame portion are distributed to form a conical tip having a gradually decreasing width.

14. The flame apparatus of the electric candle according to claim 13, wherein each group of the lamp beads are distributed to form the conical tip and are distributed symmetrically by taking a center axis of the flame portion as a symmetrical axis.

15. The flame apparatus of the electric candle according to claim 14, wherein a spacing between some of the plurality of lamp beads arranged at an upper half of the flame portion is gradually increased in a direction extending towards the conical tip.

16. The flame apparatus of the electric candle according to claim 13, wherein the plurality of groups of the lamp beads are located in three functional areas along an axial direction of the flame portion from a bottom to the top of the flame portion; and the three functional areas comprise, in sequence, a breathing functional area, a breathing jumping functional area, and a wind-induced flame functional area.

17. The flame apparatus of the electric candle according to claim 16, wherein the breathing functional area comprises at least a first group of lamp beads and a second group of lamp beads sequentially arranged from the bottom to the top, the first group of lamp beads and the second group of lamp beads are configured to have a breathing variation according to a set time sequence, and a breathing variation frequency of the second group of lamp beads is greater than that of the first group of lamp beads.

18. The flame apparatus of the electric candle according to claim 16, wherein the breathing jumping functional area comprises at least a third group of lamp beads and a fourth group of lamp beads that are sequentially arranged from the bottom to the top;

the third group of lamp beads and the fourth group of lamp beads are configured to cyclically illuminate in a sequence from the bottom to the top and from the top to the bottom, according to a set time sequence; and each group of the third group of lamp beads and the fourth group of lamp beads exhibits a breathing variation;

a cyclic illuminating frequency of the fourth group of lamp beads is greater than that of the third group of lamp beads, and a breathing variation frequency of the fourth group of lamp beads is lower than that of the third group of lamp beads.

19. The flame apparatus of the electric candle according to claim 16, wherein the wind-induced flame functional area comprises at least a fifth group of lamp beads and a sixth group of lamp beads that are sequentially arranged from the bottom to the top;

the fifth group of lamp beads and the sixth group of lamp beads are configured to illuminate cyclically in sequence from the bottom to the top according to a set time sequence, and a cyclic illuminating frequency of the sixth group of lamp beads is greater than that of the fifth group of lamp beads.

20. The flame apparatus of the electric candle according to claim 11, wherein the control module is a control chip arranged with a plurality of pins, the PCBA board is further arranged with a conductive line, and each of the plurality of pins is electrically connected to a corresponding lamp bead through the conductive line.

* * * * *